(12) United States Patent
Paillet et al.

(10) Patent No.: US 8,522,512 B2
(45) Date of Patent: Sep. 3, 2013

(54) ROUND BALER HAVING A WEB WRAP APPARATUS

(75) Inventors: Frédéric Paillet, Gray (FR); Pascal Gresset, Arc-les-Gray (FR); Jean Viaud, Reyssouze (FR); Emmanuel Chapon, Velet (FR); David Beaufort, Arc-les-Gray (FR); Sébastien Guerin, Bar sur Aube (FR)

(73) Assignee: Deere & Company, Moline, IL (US)

( * ) Notice: Subject to any disclaimer, the term of this patent is extended or adjusted under 35 U.S.C. 154(b) by 624 days.

(21) Appl. No.: 12/719,925

(22) Filed: Mar. 9, 2010

(65) Prior Publication Data
US 2010/0236191 A1  Sep. 23, 2010

(30) Foreign Application Priority Data
Mar. 18, 2009 (EP) ................... 09155480

(51) Int. Cl.
*B65B 63/04* (2006.01)
(52) U.S. Cl.
USPC .................. 53/116; 53/118; 53/587
(58) Field of Classification Search
USPC ............ 53/116, 118, 389.2, 389.4, 587
See application file for complete search history.

(56) References Cited

U.S. PATENT DOCUMENTS

| 4,686,812 | A | * | 8/1987 | Bruer et al. | 53/118 |
|---|---|---|---|---|---|
| 5,581,973 | A | * | 12/1996 | Underhill | 53/118 |
| 5,581,974 | A | * | 12/1996 | Underhill et al. | 53/118 |
| 5,687,548 | A | * | 11/1997 | McClure et al. | 53/399 |
| 6,021,622 | A | * | 2/2000 | Underhill | 53/118 |
| 6,467,237 | B2 | * | 10/2002 | Viaud | 53/118 |
| 6,796,109 | B2 | * | 9/2004 | Viaud | 53/587 |
| 7,322,167 | B2 | * | 1/2008 | Chapon et al. | 53/389.2 |
| 7,644,563 | B2 | * | 1/2010 | De Gersem | 53/587 |
| 2001/0013214 | A1 | * | 8/2001 | Viaud | 53/116 |
| 2002/0029542 | A1 | * | 3/2002 | Davis et al. | 53/399 |
| 2002/0046552 | A1 | * | 4/2002 | Huchet et al. | 53/587 |
| 2007/0169441 | A1 | * | 7/2007 | Viaud | 53/587 |
| 2008/0092489 | A1 | * | 4/2008 | Smith | 53/430 |
| 2008/0092756 | A1 | * | 4/2008 | Vande Ryse | 100/5 |
| 2009/0272072 | A1 | * | 11/2009 | Paillet et al. | 53/118 |

FOREIGN PATENT DOCUMENTS

DE  3418681 A1 * 11/1985
EP  766 912     4/1997

* cited by examiner

*Primary Examiner* — Alexandra Elve
*Assistant Examiner* — Eyamindae Jallow

(57) ABSTRACT

A round baler is provided having a web wrap apparatus with a feeder for introducing web into a bale chamber through a gap between adjacent motion means. The motion means are provided with protrusions, and anti-interference spacing means are provided to prevent the feeder from contacting the protrusions.

14 Claims, 3 Drawing Sheets

ROUND BALER HAVING A WEB WRAP APPARATUS

FIELD OF THE INVENTION

This invention relates to a round baler having a web wrap apparatus comprising a feeder to move web into a bale chamber along a motion means, the motion means having at least one protrusion.

BACKGROUND OF THE INVENTION

EP 766 912 discloses a round baler having a net feed device, moveable between a waiting position and a feeding position. In the feeding position the feed device enters a space between a roll and a chain slat conveyor. The chain slat conveyor has transverse slats, bars or shafts with spaces between. The roll has several axially extending bars on its shell.

The problem this invention is based on is that the feed device may enter into the spaces between the slat, bars or the like, if it is bent due to external forces, e.g. due to accumulated crop, foreign objects, problems with the actuators eta This may damage the feeder or cause noise, depending on whether the chain and slat conveyor or the roll is hit.

SUMMARY OF THE INVENTION

Using one or more anti-interference spacing means assures, that the feeder cannot get to the protrusion. This anti-interference spacing means is provided in the area of the protrusion and is different from a travel limiter for the feeder, since the latter may not control the movement of the leading part of the feeder. The motion means can be a roll delimiting the bale chamber, a roll feeding the web into a gap elsewhere, a belt with slats, or a chain with bars, etc.

If the anti-interference spacing means are connected to the motion means, they are at least as high as any protrusion on the moving part. This will assure, that the feeder cannot hit the protrusion and be destroyed or pushed back from slats or bars moving in the opposite direction as the feeder, or rattles against them, if they move in the same direction.

As an alternative the anti-interference means may be formed as stationary or mobile guides, like bars, rails, etc. provided to prohibit access to the protrusions and normally being fixed to a frame. This could be a simple stop on a wall or a guide, if the motion part itself is provided on a moving frame, etc.

Protrusions may exist in many different varieties and on many different kinds of carriers. For example, motion means may be formed as a roll, and protrusions formed as bars welded or bolted onto a cylindrical surface of it, or formed into a shell of such a roll, like pressed ribs. Protrusions may also exist on the slats of a chain and slat conveyor, or on bars of belts, etc.

Such anti-interference spacing means may be rings welded or bolted onto a cylindrical surface of a roll, or be formed into said surface. They may intersect or overlap the protrusion or be located aside of them. They may also be made of a different material, since they need not be as hard as the protrusions. In the case of a chain and slat conveyor anti-interference means may be formed as rings connected to and or rotating with wheels or sprockets idling the chain and slat conveyor. One or more such anti-interference spacing means may be provided along the length of the motion means, like at the outer ends, in the center, or close to the outer ends.

Since a mechanical conflict may arise between a single motion means and the feeder, this invention is also desirable, where only one motion means is given, like at the crop entrance to the bale chamber, whereas the direction of movement may be either way.

The invention is also desirable, where the feeder enters a gap between two adjacent motion means, leaving a close gap between them only, since this may lead to an interaction at both sides of the gap. Especially if the feeder is sort of a duck-bill with one or more moveable parts, which may not return to their position, e.g. because foreign objects block them.

The invention can be used apart from a gap or crop entrance, at a place, where web is caught and fed to the bale chamber at a remote end.

Since it is desirable to avoid a contact between the feeder and the motion means, the anti-interference spacing means may also be provided on the feeder rather than on the motion means. They could be formed as fingers, tines, cut-outs of a rigid or moveable portion of the feeder or components thereof etc. contacting areas on the motion means, which do not have protrusions. Advantageously the anti-interference spacing means or the motion means have low friction surfaces, like a Teflon coating, which avoid sparks or wear, when they contact each other; plastic may be used as well.

BRIEF DESCRIPTION OF THE DRAWINGS

The embodiments of the invention are described in more detail below with reference to the accompanying drawings wherein.

DESCRIPTION OF THE PREFERRED EMBODIMENT

Figure 1:
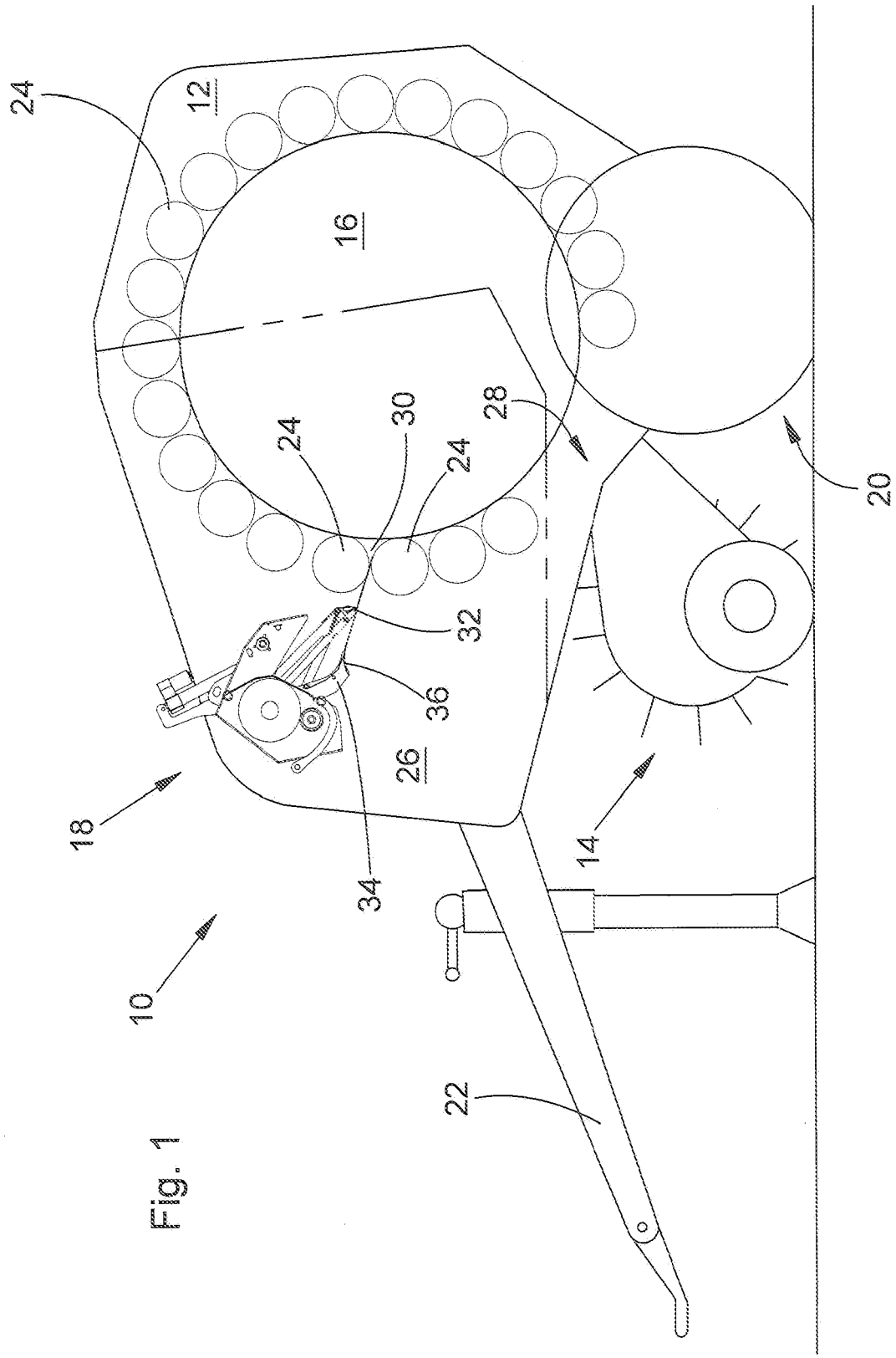
FIG. 1 is a schematic side view of a round baler provided with a web wrap apparatus.

FIG. 1 shows a round baler 10, which has a chassis 12, a pick-up 14, a bale chamber 16, a web wrap apparatus 18, an axle with wheels 20, a tongue 22, and motion means 24.

The round baler 10 is of an ordinary fixed chamber design, but it will be recognized that the it could also be a variable chamber baler.

The chassis 12 rests on the axle with wheels 20, carries the pick-up 14, and can be connected with a tractor or the like by means of the tongue 22. The chassis 12 has side walls 26, which are apart from each other to receive between them the bale chamber 16, all or part of the web wrap apparatus. 18, and the motion means 24.

The pick-up 14 picks up crop from the ground and delivers it to the bale chamber 16 through a crop inlet 28 between the motion means 24.

The bale chamber 16 is covered substantially by the motion means 24 on the circumference and by the side walls 26 on the face side. Besides the crop inlet 28 a gap 30 is provided between the motion means 24, through which the web 32 may be fed into the bale chamber 16. The bale chamber 16 serves to form a cylindrical bale of hay, straw or the like, which will be covered by the web 32 of plastic film, net, paper or similar material. The motion means 24 in this embodiment are in the form of steel rolls rotatably received in the sidewalls 26 and extending perpendicular to them. These motion means 24 are arranged generally in a circle.

The web wrap apparatus 18 will not be described in detail, since itself is known in the art, e.g. from European patent application 08155506.2 filed on 30 Apr. 2008. It is sufficient to point out, that the web wrap apparatus 18 has a feeder 34 like a so-called "duck-bill" with a carrier 36, like a mouthpiece or comb or the like moved into the gap 30 with a hanging portion of the web 32 to be inserted into the bale chamber 16. This is shown substantially in FIG. 2.

Figure 2:
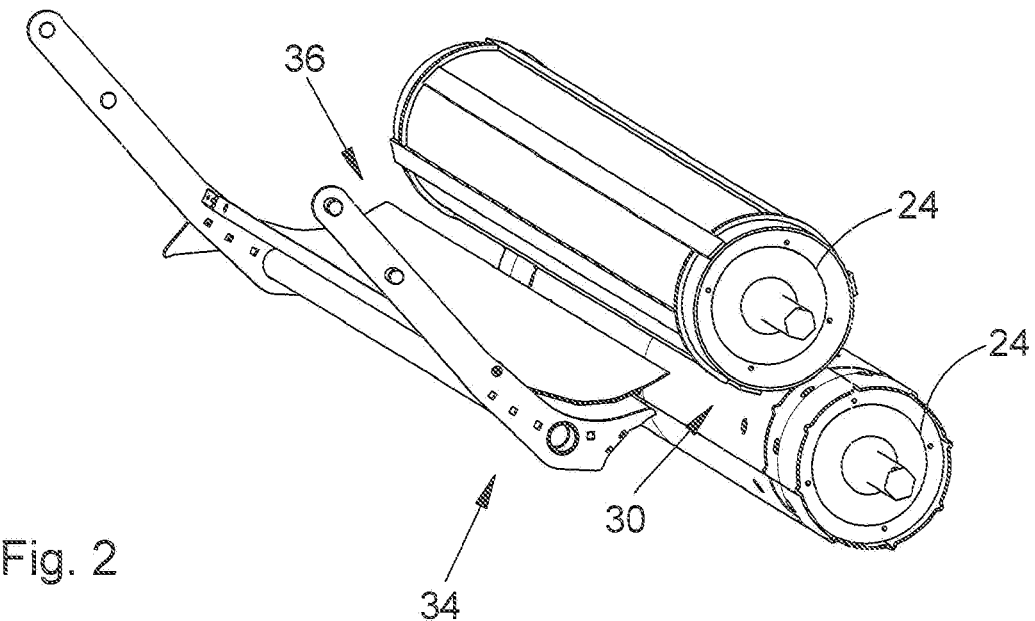
FIG. 2 is a perspective view of the motion means of the round baler with a gap therebetween and a feeder approaching the gap.
Figure 3:
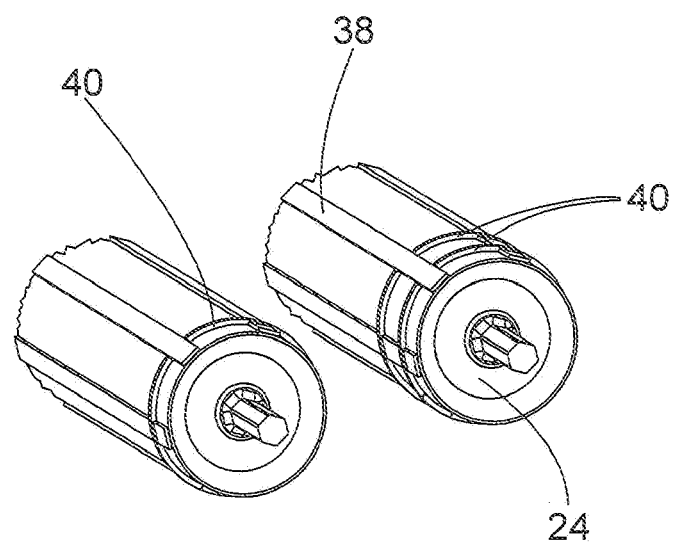
FIG. 3 is a perspective view of the motion means of the round baler with different arrangements of anti-interference spacing means; and, FIG. 4 is a perspective view of the an alternative embodiment with anti-interference spacing means on the feeder.

FIG. 3 shows two versions of a motion means 24, which is formed as a roll. Such motion means 24 are provided on at least one side of the gap 30. The motion means 24 are provided with axially extending protrusions 38; those may also show an inclination to the axis of the motion means 24 and may be bars welded or bolted to a roll body or ribs. Anti-interference spacing means 40 are also provided on the circumference of the motion means 24. These anti-interference spacing means 40 are formed as rings of at least the same height as the protrusions 38 or even slightly higher. As shown in FIG. 2 one or more anti-interference spacing means 40 may be provided and they may be provided at the end of the protrusions 38 or intersecting them, or they may be provided further away from the end. Depending on the rotation of the bale in bale chamber 16 at least one of the motion means 24 forming the gap 30, rotates away from the bale chamber 16 in the plane of the gap 30. It will be noted that the gap 30 is very narrow and leaves little space for carrier 36. The dimensions of the gap 30, the carrier 36, the protrusions 38 and the anti-interference spacing means 40 are chosen such, that in case of a mechanical deformation of the feeder 34, the carrier 36 would contact the anti-interference spacing means 40 but could not reach the protrusions 38. Thus it would neither be pushed out of the gap 30 nor destroyed.

Figure 4:
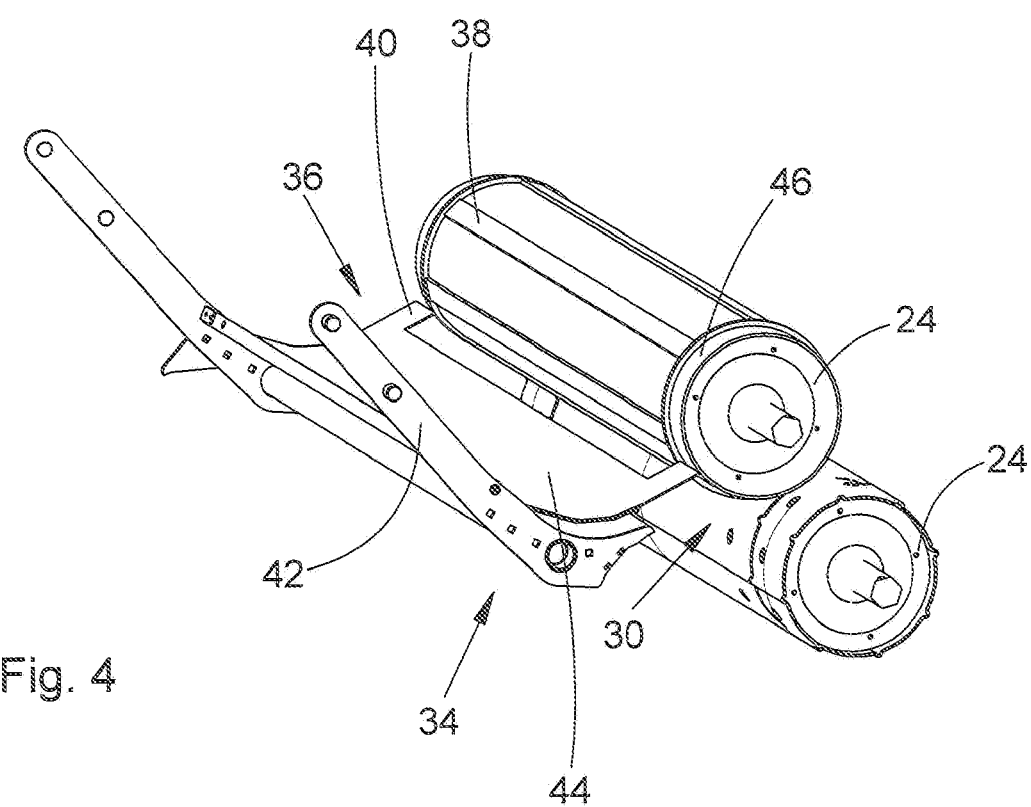

According to the alternative embodiment shown in FIG. 4 the feeder 34 has a rigid portion 42 and a moveable portion 44 pivotably attached to the rigid portion. The anti-interference spacing means 40 are formed as extensions of the moveable portion 44, like fingers. The motion means 24 have in their end areas contact areas 46, to which the protrusions do not extend. This smooth and even ring like area and the anti-interference spacing means are located opposite to each other, such, that in a case, in which the anti-interference spacing means 40 would hit the motion means 24, they would contact the contact area 46 and avoid a contact with the protrusions 38. Teflon, plastic or other like materials may be provided on the anti-interference spacing means 40 or on the contact area 46, so as to avoid creating sparks or wear in the case of contact. The-anti-interference spacing means 40 may also be provided on the rigid portion 42 instead.

Having described the preferred embodiment, it will become apparent that various modifications can be made without departing from the scope of the invention as defined in the accompanying claims.

The invention claimed is:

1. A round baler having a web wrap apparatus comprising a feeder to move web into a bale chamber along a roll, the roll having at least one protrusion, wherein rings are provided to prevent the feeder from contacting the at least one protrusion, the rings being one of: welded, bolted onto, and formed into a shell of the roll.

2. A round baler according to claim 1, wherein the rings are at least as high as the at least one protrusion.

3. A round baler according to claim 1, wherein the rings are formed as guides covering the roll to an extent necessary to prohibit access to the protrusion.

4. A round baler according to claim 1, wherein the at least one protrusion is formed as at least one bar that is one of: welded, bolted onto, and formed into a shell of the roll.

5. A round baler according to claim 1, wherein the roll partially cover the bale chamber.

6. A round baler according to claim 1, wherein two rolls partially cover the bale chamber and are located on opposite sides of pg,10 a gap, and wherein the rolls move in opposite directions with respect to the gap.

7. A round baler according to claim 1, wherein the roll is provided to transport web to a gap ending in the bale chamber.

8. A round baler according to claim 1, wherein the rings are provided on the feeder and the roll is provided with a contact area free of protrusions.

9. A round baler having a web wrap apparatus comprising a feeder to move web into a bale chamber along a chain and slat conveyor, the chain and slat conveyor having at least one protrusion, wherein rings are provided to prevent the feeder from contacting the at least one protrusion, the rings being one of: connected to and rotating with wheels idling the chain and slat conveyor.

10. A round baler according to claim 9, wherein the rings are at least as high as the at least one protrusion.

11. A round baler according to claim 9, wherein the rings are formed as guides covering the chain and slat conveyor to an extent necessary to prohibit access to the protrusion.

12. A round baler according to claim 9, wherein the chain and slat conveyor partially covers the bale chamber.

13. A round baler according to claim 9, wherein the chain and slat conveyor is provided to transport web to a gap ending in the bale chamber.

14. A round baler according to claim 9, wherein the rings are provided on the feeder and the chain and slat conveyor is provided with a contact area free of protrusions.

* * * * *